United States Patent
Schumacher et al.

(10) Patent No.: US 7,726,607 B2
(45) Date of Patent: Jun. 1, 2010

(54) FLIGHT PASSENGER SEAT WITH AN INTEGRATED SPRING ELEMENT

(75) Inventors: Markus Schumacher, Buxtehude (DE); Andrew Muin, Harsefeld (DE)

(73) Assignee: Airbus Deutschland GmbH (DE)

( * ) Notice: Subject to any disclaimer, the term of this patent is extended or adjusted under 35 U.S.C. 154(b) by 934 days.

(21) Appl. No.: 11/134,754

(22) Filed: May 20, 2005

(65) Prior Publication Data

US 2005/0269451 A1    Dec. 8, 2005

Related U.S. Application Data

(60) Provisional application No. 60/598,265, filed on Aug. 3, 2004.

(30) Foreign Application Priority Data

May 21, 2004    (DE) .................. 10 2004 025 125

(51) Int. Cl.
  B64D 11/06    (2006.01)
  A47C 1/022    (2006.01)
  B60N 2/02     (2006.01)

(52) U.S. Cl. ............... 244/122 R; 297/334; 297/335; 297/362.13

(58) Field of Classification Search ........... 244/118.5, 244/118.6, 122 R; 296/65.16, 65.17; 297/331, 297/332, 334, 335, 301.1, 302.2, 362.13
See application file for complete search history.

(56) References Cited

U.S. PATENT DOCUMENTS

| | | | | |
|---|---|---|---|---|
| 2,280,065 A | * | 4/1942 | De Roode | 244/118.6 |
| 2,500,124 A | * | 3/1950 | Hoven | 297/342 |
| 2,523,960 A | * | 9/1950 | Liljengren et al. | 297/43 |
| 2,652,881 A | * | 9/1953 | Rowe | 297/332 |
| 3,024,067 A | * | 3/1962 | Brandoli | 297/362.13 |
| 3,037,812 A | * | 6/1962 | Monroe | 297/362.13 |
| 3,398,986 A | * | 8/1968 | Homier | 297/375 |
| 3,468,582 A | | 9/1969 | Judd | |
| 3,744,843 A | * | 7/1973 | Barecki et al. | 297/316 |
| 3,744,844 A | * | 7/1973 | Nomaki et al. | 297/362.13 |
| 3,762,766 A | | 10/1973 | Barecki et al. | |
| 3,902,755 A | * | 9/1975 | Sirot | 297/339 |
| 4,157,797 A | * | 6/1979 | Fox | 244/122 R |
| 4,787,675 A | * | 11/1988 | McLeod | 297/335 |
| 4,790,496 A | * | 12/1988 | Marrujo | 244/122 R |
| 4,824,172 A | * | 4/1989 | Rees | 297/361.1 |

(Continued)

FOREIGN PATENT DOCUMENTS

DE    195 34 024 C2    7/1997

(Continued)

*Primary Examiner*—Tien Dinh
*Assistant Examiner*—Joseph W Sanderson
(74) *Attorney, Agent, or Firm*—Lerner, David, Littenberg, Krumholz & Mentlik, LLP

(57) ABSTRACT

A flight passenger seat for an airplane. The flight passenger seat may comprise a back element, a seat element and an arm rest. The seat element, back element, and arm rest may be pivotable. Reset elements for an automatic pivoting may be integrated into the back element and the seat element in such a way that they occupy as little traffic area space as possible. In an advantageous manner, this allows for an enlargement of a traffic area in an airplane and thereby may effectuate a reduction of a "turn around" time of an airplane.

16 Claims, 11 Drawing Sheets

U.S. PATENT DOCUMENTS

| | | | | |
|---|---|---|---|---|
| 4,881,775 A * | 11/1989 | Rees | ..................... | 297/362.14 |
| 4,890,887 A * | 1/1990 | Koutsky et al. | ............. | 297/320 |
| 4,904,003 A * | 2/1990 | Yamazaki et al. | ........... | 292/126 |
| 5,320,308 A * | 6/1994 | Bilezikjian et al. | ...... | 244/122 R |
| 5,333,818 A * | 8/1994 | Brandt et al. | ............ | 244/118.6 |
| 5,368,355 A * | 11/1994 | Hayden et al. | ........... | 296/65.13 |
| 5,482,230 A * | 1/1996 | Bird et al. | ................... | 244/121 |
| 5,829,836 A | 11/1998 | Schumacher et al. | | |
| 5,961,073 A * | 10/1999 | Wittmann | ............... | 244/122 R |
| 6,179,362 B1 * | 1/2001 | Wisniewski et al. | ...... | 296/65.01 |
| 6,209,943 B1 * | 4/2001 | Neale et al. | .............. | 296/65.01 |
| 6,227,489 B1 * | 5/2001 | Kitamoto et al. | ......... | 244/118.5 |
| 6,270,141 B2 * | 8/2001 | Moon et al. | .............. | 296/65.17 |
| 6,305,644 B1 * | 10/2001 | Beroth | .................... | 244/118.5 |
| 6,450,580 B1 * | 9/2002 | Drew et al. | ............ | 297/378.12 |
| 6,478,256 B1 * | 11/2002 | Williamson | ............. | 244/122 R |
| 6,481,798 B2 * | 11/2002 | Romca et al. | ............ | 297/354.1 |
| 6,499,787 B2 * | 12/2002 | Jach et al. | ................ | 296/65.09 |
| 6,523,900 B1 * | 2/2003 | Conner et al. | ............... | 297/332 |
| 6,568,736 B2 * | 5/2003 | Jach et al. | ................ | 296/65.09 |
| 6,595,587 B2 * | 7/2003 | Konishi et al. | ............. | 297/331 |
| 6,595,588 B2 * | 7/2003 | Ellerich et al. | ............. | 297/331 |
| 6,644,738 B2 * | 11/2003 | Williamson | ................. | 297/232 |
| 6,669,295 B2 * | 12/2003 | Williamson | ............ | 297/362.13 |
| 6,776,457 B2 * | 8/2004 | Muin et al. | ................. | 297/331 |
| 6,886,450 B2 * | 5/2005 | Knopp | ........................ | 91/437 |
| 6,908,151 B2 * | 6/2005 | Meeker et al. | ............ | 297/250.1 |
| 6,935,691 B1 * | 8/2005 | Sasaki et al. | .............. | 297/344.1 |
| 7,000,989 B2 * | 2/2006 | Fisher | ........................ | 297/335 |
| 7,059,681 B2 * | 6/2006 | Kubo | ......................... | 297/410 |
| 7,070,149 B2 * | 7/2006 | McDonnell | ............... | 244/118.5 |
| 7,090,296 B2 * | 8/2006 | Massimo | .................... | 297/319 |
| 7,213,882 B2 * | 5/2007 | Dryburgh et al. | ...... | 297/354.13 |
| 7,249,801 B2 * | 7/2007 | Tonin | ...................... | 297/300.5 |
| 2003/0025371 A1 | 2/2003 | Veneruso | | |
| 2003/0085601 A1 | 5/2003 | Hudswell et al. | | |
| 2003/0094542 A1 * | 5/2003 | Williamson | ............. | 244/122 R |
| 2003/0094842 A1 | 5/2003 | Williamson | | |
| 2003/0209929 A1 | 11/2003 | Muin | | |
| 2004/0075323 A1 * | 4/2004 | Blair et al. | .................. | 297/331 |
| 2004/0232283 A1 * | 11/2004 | Ferry et al. | ............... | 244/118.6 |

FOREIGN PATENT DOCUMENTS

| | | | |
|---|---|---|---|
| DE | 102 14 104 C1 | | 11/2003 |
| DE | 10 2004 002 169 A1 | | 9/2005 |
| EP | 1 308 344 A | | 5/2003 |
| EP | 1 348 625 A2 | | 10/2003 |
| EP | 1 637 451 A | | 3/2006 |
| FR | 2 069 294 A | | 9/1971 |
| GB | 1 326 904 | | 8/1973 |
| JP | 2005335703 A | * | 12/2005 |
| WO | 2005/066023 A | | 7/2005 |

* cited by examiner

FLIGHT PASSENGER SEAT WITH AN INTEGRATED SPRING ELEMENT

CROSS-REFERENCE TO RELATED APPLICATIONS

This application claims the benefit of the filing date of U.S. Provisional Patent Application No. 60/598,265 filed Aug. 3, 2004, the disclosure of which is hereby incorporated herein by reference.

FIELD OF THE INVENTION

The present invention relates to a flight passenger seat, e.g. for a passenger cabin of a passenger airplane. In particular, the present invention relates to a seat and a seat group for an airplane.

BACKGROUND OF THE INVENTION

Conventional flight passenger seats for airplanes have a support frame with either a seat area fixedly disposed thereon or a pivoting seat area. In the region of the rear edge of the seat area, a back rest is disposed. In airplanes, the passenger seats preferably form seat rows, wherein two or several adjacently disposed passenger seats or seats may be combined to one seat group supported by one shared support frame. Nowadays, in the case of seats having a pivoting seat area, there may be differentiation among several embodiments. There are models, at which the folding mechanism has to be operated manually in a disadvantageous manner. In the case of automatically pivoting seat areas, it proves to be disadvantageous that, for example, not all seats of a seat group are pivotable, or, on the other hand, elements of a seat which are, for example, required for the folding mechanism, extend into the space cleared due to pivoting in an obstructing manner. Usually, the seat mechanicals are relatively large.

Usually, there is disposed an arm rest at each side of a seat. The seat groups are provided as stiff units for the mounting in the passenger cabins of the airplanes. According to the requirement of the airlines, this may lead to diverse configurations, wherein primarily a maximum seat capacity is strived for.

One disadvantage of a passenger cabin having a large number of seats is that due to the narrow cabin's longitudinal corridors—also called a traffic area or aisle—between the seat rows, boarding and deboarding of the passengers requires a large expenditure of time. Particularly, deadlocks may be generated, when the passengers remain the corridor stowing away hand luggage, for example, in the overhead bins above the seats. Thereby, the corridor is obstructed. Usually, the cabin's corridors are too narrow to enable two flight passengers to pass by one another. Even during cleaning operations a space between the seat rows is hardly accessible.

The ground time between successive flights of an airplane—also called "turn around"—time is of great importance for the cost effectiveness of a commercial aircraft. In spite of a high seat occupancy in the passenger cabin, it is necessary that the traffic area be configured in such a way that a speedy boarding and deboarding of the passengers is allowed for, and that the expenditure of time for necessary ground works is minimized.

SUMMARY OF THE INVENTION

According to an exemplary embodiment of the present invention, a flight passenger seat for an airplane is provided, comprising a back element, a seat element and at least one reset element. At least one of the seat element and the back element is pivotable. At least one reset element acts upon at least one of the back element and the seat element. The at least one of the seat element and the back element provides a first volume, for accommodating the at least one reset element.

This may allow to provide a flight passenger seat, where the mechanical elements of the seat occupy only little extra space. The accommodation of the at least one reset element in the volume of at least one of the back element and the seat element may allow to reduce the amount of traffic area occupied confined by the mechanics of the at least one pivoting seat element or back element. Thus, obstacles in the traffic area may be avoided, which may allow for an "enlargement" of the traffic area, i.e. the areas in the passenger cabin of an airplane, in which the persons may move. It may be achieved that passengers are not obstructed by any mechanical seat elements, when they step between two consecutive seat rows, for example, for stowing away the luggage in overhead bins above or below the seats. This may allow the passengers to clear the corridor, so that other passengers may go to their seats.

According to a further exemplary embodiment of the present invention, there may be an interlock for the pivoting back element. This interlock may, exemplarily, be adapted as raster or break which prevents the pivoted back element from autonomously returning to its home position, due to the backward-urging effect of the reset element. Advantageously, when taking the seat, the passenger has the opportunity to rest in a comfortable seat position.

According to a further exemplary embodiment of the present invention, the back element may be mounted to at least one rocker element. The reset element acts upon this rocker element, which causes the back element to return to its home position, upon pivoting the back element. The rocker element is supported by support bolts. In an advantageous manner, the pivoting function of the back element is made possible this way. At least one first reset element, by means of the rocker element, thereby acts directly on the back element. Thus, only bearing forces are effective within the support bolts. Thus, possible torsion forces are reduced. Expenses and material for the production of this bearing can be minimized. The reset elements may be mounted to the supporting stands of the seats in such a way that, when pivoting the seat area, they do not obstruct the cleared traffic area beyond the area used for the support frame of the seats.

According to a further exemplary embodiment of the present invention, the reset element may be accommodated in the volume defined by the back element. The space occupied by the reset element may thus be reduced. Due to the design of the volume having a recess for the reset element, according to the invention, this integration may be carried out without causing an impairment for a passenger taking a flight passenger seat.

According to a further exemplary embodiment of the present invention, the reset element is applied in a vertical position. As compared to a horizontal arrangement, this arrangement may allow that the reset element does not extend into the area which is cleared when pivoting the seat element. This possibility is given, if the installation is horizontal, as reset elements may often be designed as linearly acting source of force. Since the direction of pivoting of a back element is directed into the traffic area which has to be kept clear, a linear source of force would result in being directed into the traffic area.

According to a further exemplary embodiment of the present invention, in order to provide the comfort feature of a pivotable back element having an automatic resetting function without reducing the traffic area cleared when pivoting the seat elements, a reset element may be applied, which is guided in a first link with a linear guide. In an advantageous manner, when pivoting the back element, into which the first reset element—advantageously at the foot of the reset element—is integrated, the reset element is operated by the link linear guide in such a manner that a force opposed to the pivoting movement arises, which, on releasing the tension of the reset element, leads the back element into a vertical position again. Thus, a horizontal installation of the reset element, which on pivoting the seat element could reduce the cleared traffic area, can be avoided.

According to a further exemplary embodiment of the present invention, a vertical installation of the reset element may be obtained, when simultaneously integrating it into the back element, in that one end of the reset element is connected to a turn-around lever which is guided in a second cavity-shaped link. On exercising the pivoting movement of the back element, this turn-around lever is moved in such a way that in cooperation with the second link it compresses one end of the reset element in such a way that a force opposed to the pivoting movement is generated which on releasing the tension of the reset element, leads the back element into a vertical position again.

According to a further exemplary embodiment of the present invention, a first reset element may be integrated in the volume formed by the seat element, and a second reset element may be integrated in the volume formed by the back element. The seat element and the back element may have a shared rotating or pivoting axis. The reset elements are arranged in such a way that they engage at a distance from the respective rotating axis. Due to these reset elements engaging tangentially to the center of rotation, when pivoting the seat element as well as the back element, a torque is applied which tends to inhibit the pivoting movement as soon as a release occurs. In order to compensate the pivoting movements of the reset elements occurring during the pivoting movements, for adjusting to the circumstances of articulation which are modified depending on the position, the ends of the reset elements are punctually mounted in bearings. This arrangement may allow for the pivoting of the seat element or of the back element, without having to occupy extra space from the traffic area, to this end.

According to a further exemplary embodiment of the present invention, the reset element for the seat element and the reset element for the back element, respectively, may be mounted onto an intermediate lever. The intermediate lever may be mounted to a shared axis. In case of this embodiment, it may be advantageous that the reset elements in the volume formed by the seat element, and in the volume formed by the back element, may be fixedly mounted. Thereby, no extra space has to be provided for a possible balancing movement for adjusting the articulation circumstances. The articulation circumstances modified depending on the position of the back element or seat element are leveled out by the position of the intermediate levers. Thereby, a high freedom of designing arises for the design of the seat element and of the back element.

According to a further exemplary embodiment of the present invention, when forming the reset element, there may be applied elements having a linear expansion, linear compression or springs. Examples of springs are the gas pressure spring or the spiral spring.

According to a further exemplary embodiment of the present invention, the seat element may be mounted to a first rotating axis, and the back element may be mounted to a second rotating axis. The reset elements may be realized in such a way that they directly act on the respective axis and generate a resetting moment for the seat element and for the back element, independently from each other. Thereby, the reset elements may, for example, be designed as a torsion spring, a spiral spring or a hair pin spring. In addition to the integration of the reset elements into the inside of the seat element or into the inside of the back element, respectively, this embodiment may allow for freedom when constructing this kind of flight passenger seats, and, for example, the position of the rotating axes only has to obey ergonomic considerations.

Furthermore, a cushion for a flight passenger seat is presented, wherein the cushion has at least one recess, into which, for example, a reset element like a gas pressure spring may be placed. This recess may, for example, be designed as embossment of the cushion, and thereby not affect the comfort of the cushion. Further, there is no extra space needed beyond the flight passenger seat for accommodating the reset element. The seat element may be covered with a seat cushion and the back element may be covered with a back cushion.

According to a further exemplary embodiment of the present invention, a seat group for a vehicle is provided, wherein all seat elements and back elements are pivotable. For example, the vehicle may be an airplane. Particularly, in case of an airplane, it is an aim to provide a maximum possible seat capacity in the passenger space, and at the same time a maximum possible clear traffic area. In an advantageous manner, the use of one of the above mentioned seat groups may serve to achieve this aim, particularly, if all flight passenger seats of the seat group are provided with pivoting seat elements.

BRIEF DESCRIPTION OF THE DRAWINGS

In the following, exemplary embodiments of the present invention are described with reference to the following figures.

DETAILED DESCRIPTION

Figure 1:
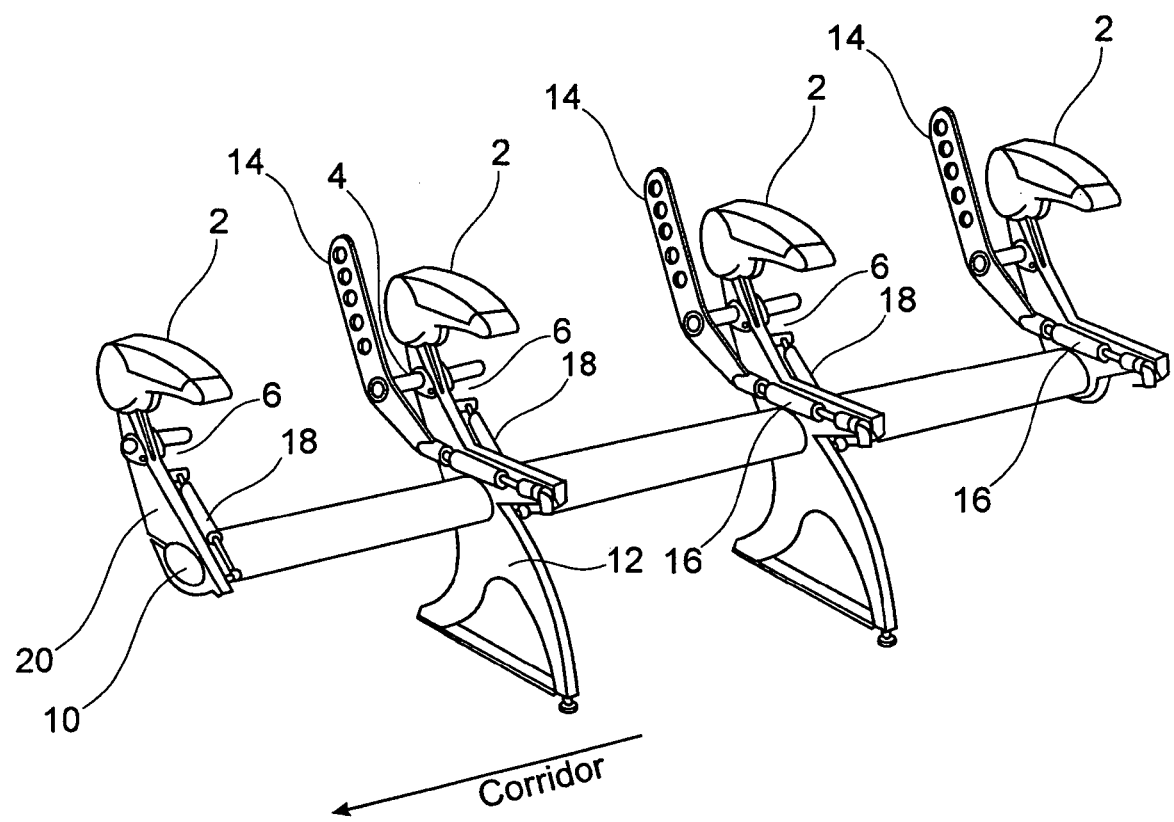
FIG. 1 shows a schematic three dimensional side view of a frame of a seat group.

In the following description, for the same or corresponding elements, the same reference numerals are used.

FIG. 1 shows a schematic three dimensional side view of a frame of a seat group according to the present invention. This frame includes a continuous support spar 10 supported by two frame feet. Further, the seat frame is connected with seat dividers 20, which laterally grasp around the back elements. Arm rests 2 are mounted at the top of the seat dividers 20. The drawing in FIG. 1 shows a frame for a seat group, at the left side of which (in the shown exemplary embodiment) there is the corridor of an airplane. Mirror-inverted, this seat group would be applied at the other side of the corridor. For clearing traffic areas, appliances are provided, which are adapted to pivoting of seat elements (the seat elements are not shown in FIG. 1). A second reset element 18 acts on a pivoting lever 6, connected with a support bolt 4 in a torque proof manner. At the support bolt 4, in a torque proof manner, there may be mounted a seat element, so that a release of the second reset element 18 by means of the pivoting lever 6 is converted into a rotating movement, and is transferred to a seat element by means of the support bolt 4. Thereby, due to the torque proof connection of the support bolt 6 with the seat element, the seat element is transferred to a vertical position. Thus, an area is cleared, which may be used as clear traffic area, for example, in order to use the overhead bins, which are mounted above the seat groups. By means of a coupling rod (not drawn in FIG. 1), the pivoting lever 6 may be coupled to the arm rest 2, so that, when releasing the second reset element 18, not only the seat element is pivoted, but in addition, the arm rest 2 is pivoted as well. This further facilitates the clearing of the traffic area, if a seat is not used. According to FIG. 1, the three arm rests 2 facing the corridor may be adapted to be automatically pivotable. In case of the arm rest 2 which is farthest away from the corridor, an automatic pivoting can only be obtained by additional effort, by mounting an additional reset element not coupled to a seat element. FIG. 1 shows that the second reset elements 18 and the pivoting lever 6 are mounted close to the seat dividers 20. Thereby, they may easily be placed in lateral cushion embossments.

Each of the seats situated in this frame may thus be pivotable individually and independently of the other seats of the group.

FIG. 1 further shows a rocker element 14 supported by the support bolt 4. At this rocker element 4, a back element may be mounted, so that a pivoting of the rocker element 4 also results in a pivoting of the back element. A first reset element 16 engages at the rocker element 14 in such a way that it urges the rocker element 14 and a back element mounted thereat into a vertical position. The support bolt 4 is designed as a passive bearing element. The torsion forces it has to receive are comparably small, so that only a small expense of material is necessary for its production, which in turn leads to savings in costs, as compared to similar known constructions. Moreover, the first reset elements 16 are mounted close to the seat divider 20. Thereby, it is prevented that it extends into the traffic area cleared when pivoting the seat elements beyond the dimension for the construction of the seat group frame.

Figure 2:
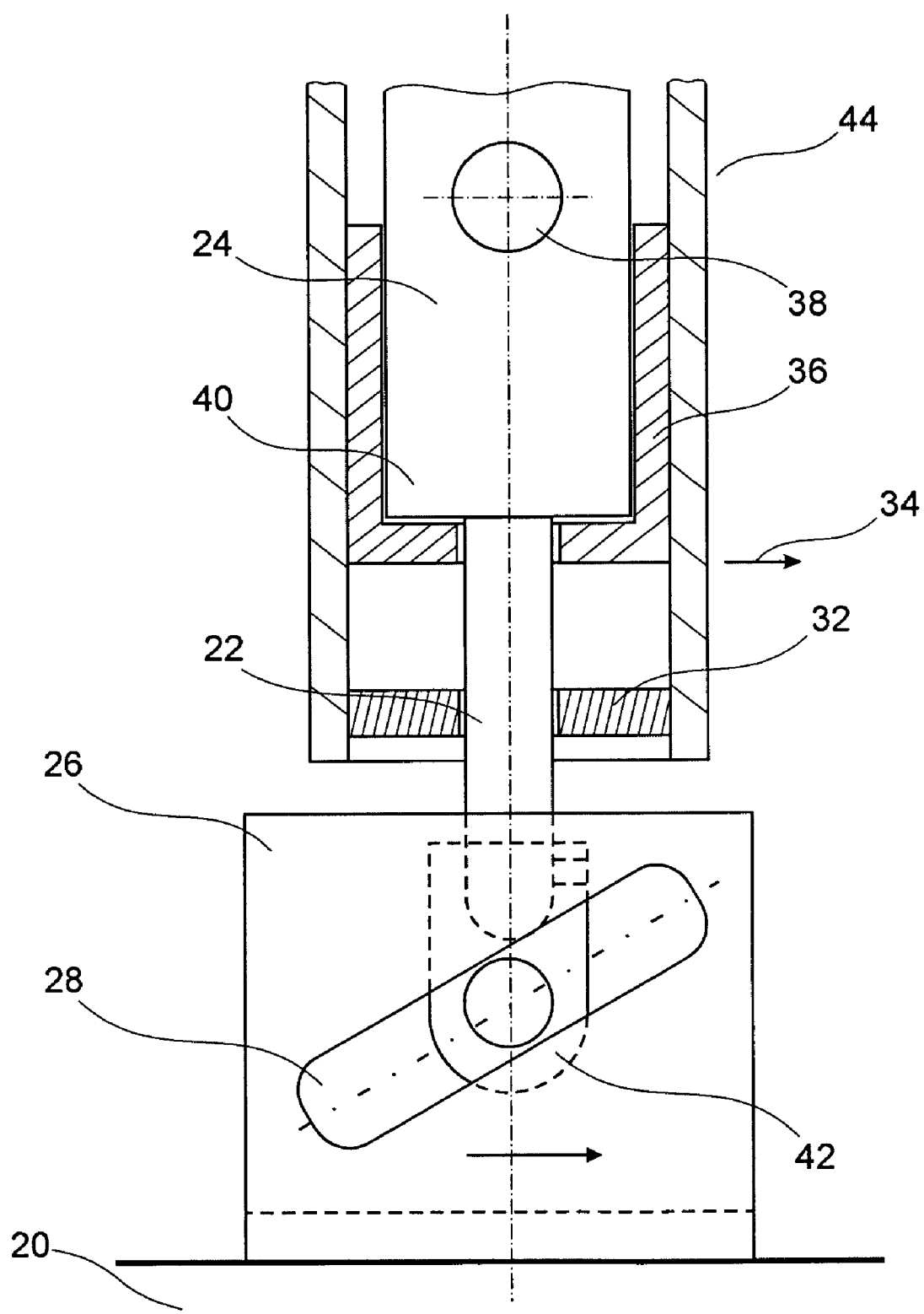
FIG. 2 shows a schematic vertical sectional view of an exemplary embodiment of a reset element in a link with a linear guide, which may be used in a further exemplary embodiment of a flight passenger seat in an airplane, according to the present invention.

FIG. 2 shows a schematic vertical sectional view of an exemplary embodiment of a reset element 24 in a link 26 with a linear guide, which may be applied in a further exemplary embodiment of a flight passenger seat in an airplane, according to the present invention. This special combination allows for a vertical insertion of the reset element, which is designed as first linear gas pressure spring 24 here. This first gas pressure spring 24, vertical to the direction of flight 34, is integrated into a volume at the foot of a back element 44. The direction of flight 34 is symbolized by an arrow in FIG. 2. The gas pressure spring may be pre-assembled in a chassis 36. By means of a snap fit which is not further described, this chassis may be locked into the back element 44 without tolerance. Thus prepared, this component has advantages with respect to easy mounting, maintenance and with respect to a better force closure.

The link 26 with the linear guide 28, designed as an elongated hole, is fixedly mounted to the seat divider 20. The elongated hole 28 has two ends in longitudinal direction. The first end defines a first distance to the center of rotation 38. This is longer than the distance of the second end with respect to the center of rotation 38. The submerging rod 22 is directed downwards and is guided in the longitudinal hole. It is guided out of the back element 44 by means of the guide 32. The center of rotation 38 of the back element is positioned above the lower end 40 of the first gas pressure spring. The pivoting of a back element usually occurs against the direction of flight 34. If the back element is now pivoted, the lower end 40 of the first gas pressure spring 24 and also the lower end of the submerging rod 22 and the bolt 42 mounted thereat are pivoted in the direction of the flight. The bolt 42 is guided in the linear guide 28 in such a way that it can only follow the movement, if it presses the submerging rod 22 into the first gas pressure spring 24. The shortening occurs due to the above described special arrangement of the elongated hole. It is a feature of a gas pressure spring 24, when being compressed, to generate a force counteracting this compression. Thereby, by means of the bolt 42 and the submerging rod 22 as a lever arm, a torque about the center of rotation 38 is generated which counteracts the cause for the pivoting. As soon as the moving force weakens, the bolt 42 is therefore shifted in the direction of the region of that elongated hole having the greater distance to the center of rotation 38. Thereby, the back element is moved again to the vertical home position.

It is believed to be useful for the seat comfort, when using the back element 44, if the force causing the pivoting does not constantly have to be applied, for example, by a passenger. For this reason, as a rule, there is provided a locking or block for the back element in the desired position. For this reason, a resetting can only be effective, if this locking or block is released.

By means of integrating the first gas pressure spring 24 into the back element 44, this component does not needlessly obstruct the traffic area of the airplane. By means of the integration of the gas pressure spring 48 into volumes, which are, for example, created by embossments of the cushion, it does not affect the seat comfort in any way. In order to avoid the danger of jamming, the region between the lower end of the back element and the link 26 may, for example, be encapsulated with a folding bellows.

Figure 3:
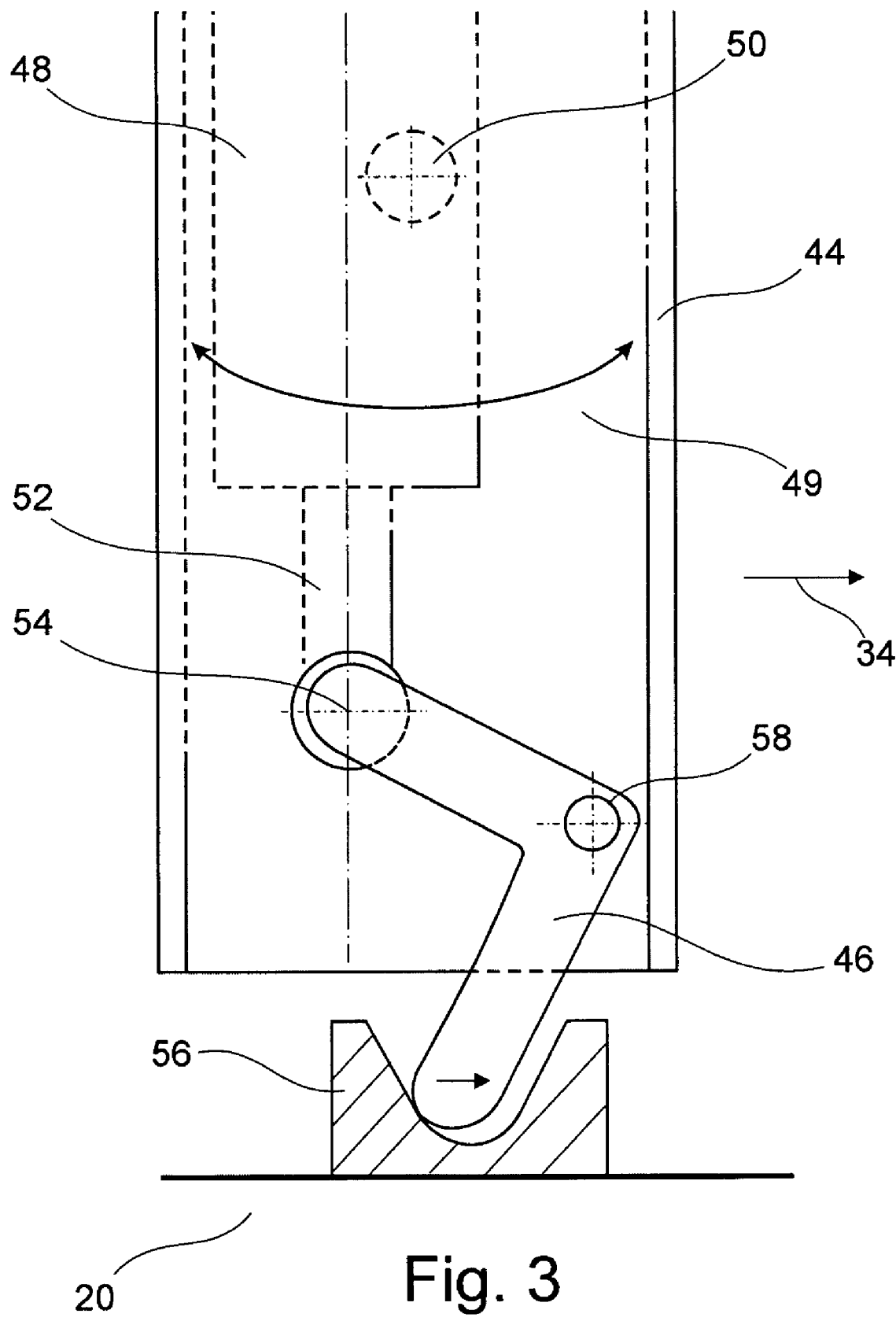
FIG. 3 shows a schematic vertical sectional view of an exemplary embodiment of a reset element with a turn-around lever in a cavity-shaped link, which may be used in a further exemplary embodiment of a flight passenger seat in an airplane, according to the present invention.

FIG. 3 shows a schematic vertical sectional view of an exemplary embodiment of a reset element having a turn-around lever 46 in a cavity-shaped link 56, which may be applied in a third exemplary embodiment of a flight passenger seat in an airplane, according to the present invention. This special combination allows for a vertical assembly of the reset element, which is designed as a second linear gas pressure spring 48 here. This second gas pressure spring 48, vertical to the direction of flight 34, is integrated into a volume at the foot of a back element 44. The direction of flight 34 is symbolized by an arrow in FIG. 3.

The cavity-shaped link 56 is fixedly mounted to the seat divider 20. The second submerging rod 52 is directed downwards towards the link 56, and is linked with the turn-around lever 46 angulated by 90° by means of a joint 54 still within the back element. The center of rotation for this turn-around lever 46 is articulated to a fixed bearing 58 within the back element. The lower end of the turn-around lever 46 is located in a cavity-shaped link 56. The pivoting of a back element usually occurs contrary to the direction of flight 34 about the center of rotation 50 of the back element. If the back element 44 is now pivoted, the lower end of the second submerging rod 52 and the turn-around lever 46 are pivoted in the direction of flight 34. The lower end of the turn-around lever is located in a form-closed manner in the cavity-shaped link 56. Thereby, the pivoting movement of the lower end of the turn-around lever 46 is stopped, and by means of the fixed bearing 58 is transformed into a clockwise circular movement about the fixed bearing 58. By means of articulation 54, which is connected to the upper end of the turn-around lever 46, the rotating movement of the turn-around lever 46 is transformed into a linear movement, which now, by means of the second submerging rod 52, compresses the second gas pressure spring 48.

It is a feature of a gas pressure spring 48, when compressed, to create a force counteracting this compression. Thereby, in reversed order, by means of the second submerging rod 52, by means of the articulation 54 and the lower end of the turn-around lever 46, a force acting upon the cavity-shaped link 56 is generated, which moves the back element into the original vertical position again.

Depending on the position of the turn-around lever 46, the position of the reset element 48 in the back element has to be adjusted to the circumstances of articulation. For this reason, there exists a punctual mounting in a bearing at the upper end of the reset element. Within the assembly space, a certain pivoting space 49 has to be available.

When using the back element 44, it may be useful for the seat comfort, if the force causing the pivoting does not constantly have to be applied, for example by a passenger. For this reason, as a rule, locking or blocking of the back element is provided in the desired position. Therefore, a resetting can only be effected, if this locking or blocking is released.

By means of the integration of the second gas pressure spring 48 into the back element 44, this component does not needlessly obstruct the cleared traffic area of the airplane. By means of the integration of the gas pressure spring 48 into volumes which, for example, are generated by embossments of cushions, the seat comfort is not negatively affected. In order to avoid the danger of clamping, the region between the lower end of the back element and the link 56 may, for example be encapsulated by a folding bellows.

Figure 4:
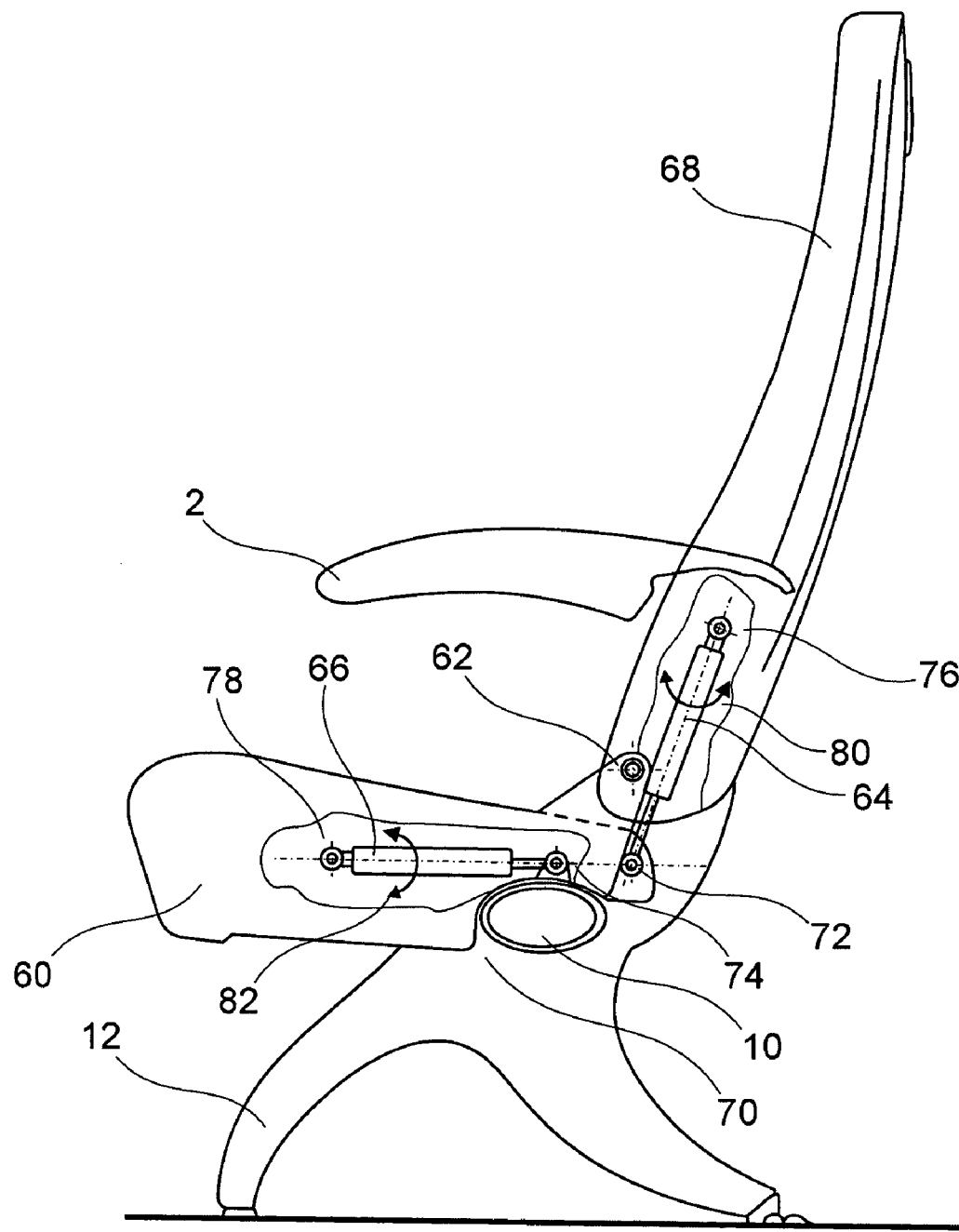
FIG. 4 shows a schematic view of a further exemplary embodiment of a flight passenger seat in an airplane, according to the present invention.

FIG. 4 shows a schematic view of a further exemplary embodiment of a flight passenger seat in an airplane, according to the present invention. The seat or flight passenger seat, respectively, comprises a seat element 60 as well as a back element 68. In FIG. 4, an arm rest 2 is shown, which is positioned on the left side of the seat in the seating direction. The seat element 60 is supported by a continuous spar 10. This, in turn, is mounted between the seat foot 12 and the seat divider 20, which is only adumbrated in this drawing. In order to lay it down onto the spar 10, there exists a contour 70 adapted to the spar structure. The back element 68 and the seat element 60 are rotatably supported by a shared axis 62. This does not necessarily have to be a shared axis. In fact, in case the seat geometry requires this, it is definitely also possible that the seat element 60 and the back element 68 be supported by different axes. There is a third 64 or a fourth 66 reset element, respectively, integrated in the back element 68 and the seat element 60.

By means of a first bolt counter bearing 72, the third reset element 64 is connected with one of the frame foot 12, the seat divider 20 and the spar 10. By means of a second bolt counter bearing 74, the fourth reset element 66 is connected with one of the frame foot 12 the seat divider 20 and the spar 10. The first bolt counter bearing 72 and the second bolt counter bearing 74 may also be combined to one shared or common bolt counter bearing. By means of a first punctual mounting 76, the third reset element 64 is connected with the back element 68. By means of a second punctual mounting 78, the fourth reset element 66 is connected with the seat element 60. FIG. 4 shows the third reset element 64 in a released state, and the fourth reset element 66 in compressed state. This state is dominant, if a passenger takes an upright position on the seat. Since both reset elements have a distance from the rotating axis 62, they both effect a moment about the rotating axis 62. The third reset element 64 effects a counterclockwise moment about the rotating axis 62 onto the back element 68, and thereby keeps the back element 68 in an upright position. The fourth reset element 66 effects a clockwise moment about the rotating axis 62 onto the seat element 60, 50 that the seat element 60 is urged into a vertical position.

The pivoting movement of the back element 68 and of the seat element 60 cause pivoting movements about the first punctual mounting 74 or the second punctual mounting 78, respectively. For this reason, there has to be provided a pivoting space 80 or 82, respectively, around the third reset element 64 and the fourth reset element 66.

Figure 5:
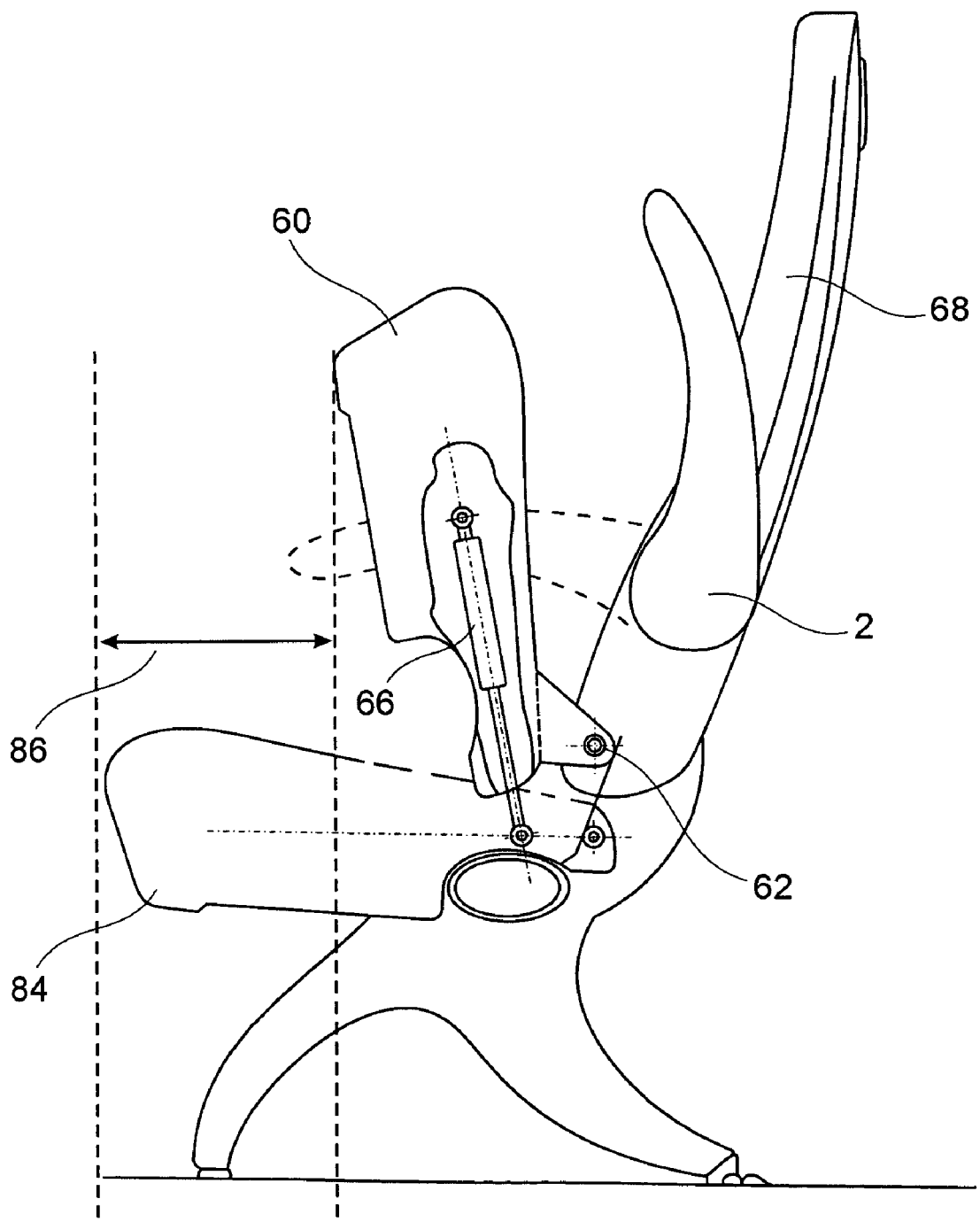
FIG. 5 shows a schematic view of a further exemplary embodiment of a flight passenger seat in an airplane, according to the present invention, having a pivoted seat element and a pivoted arm element.

FIG. 5 shows a schematic view of a further exemplary embodiment of a flight passenger seat in an airplane, according to the present invention, having a pivotable seat element and a pivotable arm element. This condition occurs, if the seat is not used and is relieved. The fourth reset element 66 is released and, by means of the moment about the rotating axis 62, has moved the seat element 60 in clockwise direction against the back element 68. In FIG. 5 it may also be seen that the arm rest 2 is optimally pivoted upwards in this state. This is achieved either manually or by coupling the arm rest 2 with the seat element 60, which is not drawn in here. For comparison, the position of the seat element in a loaded condition 84 is shown in FIG. 5. When the seat position is pivoted, the additionally cleared traffic area 86 can clearly be seen.

Figure 6:
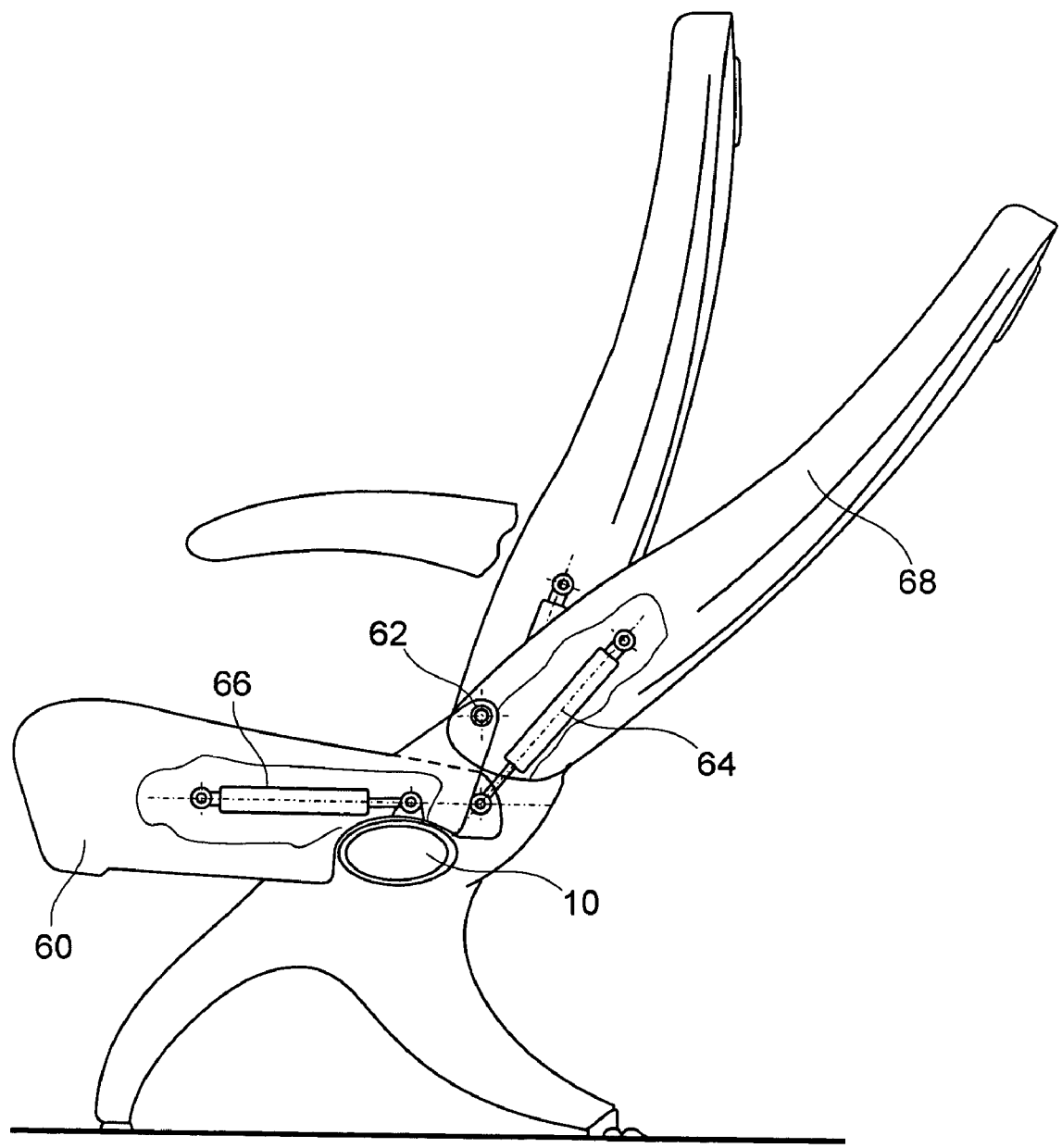
FIG. 6 shows a schematic view of a further exemplary embodiment of a flight passenger seat in an airplane, according to the present invention, having a pivoted back element.

FIG. 6 shows a schematic view of a further exemplary embodiment of a flight passenger seat in an airplane, according to the present invention, having a pivoted back element. This state occurs, when the seat element 60 is loaded and the back element 68 is pivoted. In this state, the reset elements 64 and 66 are compressed. The seat element 60 rests on the spar 10. It is kept in this position by the weight force, applied by a person who is possibly sitting on the seat element 60. In an advantageous manner, there exists a locking or blocking (not shown) for the back element, respectively, which keeps the back element in this position against the moment about the axis 62 having been induced by the reset element 64.

Figure 7:
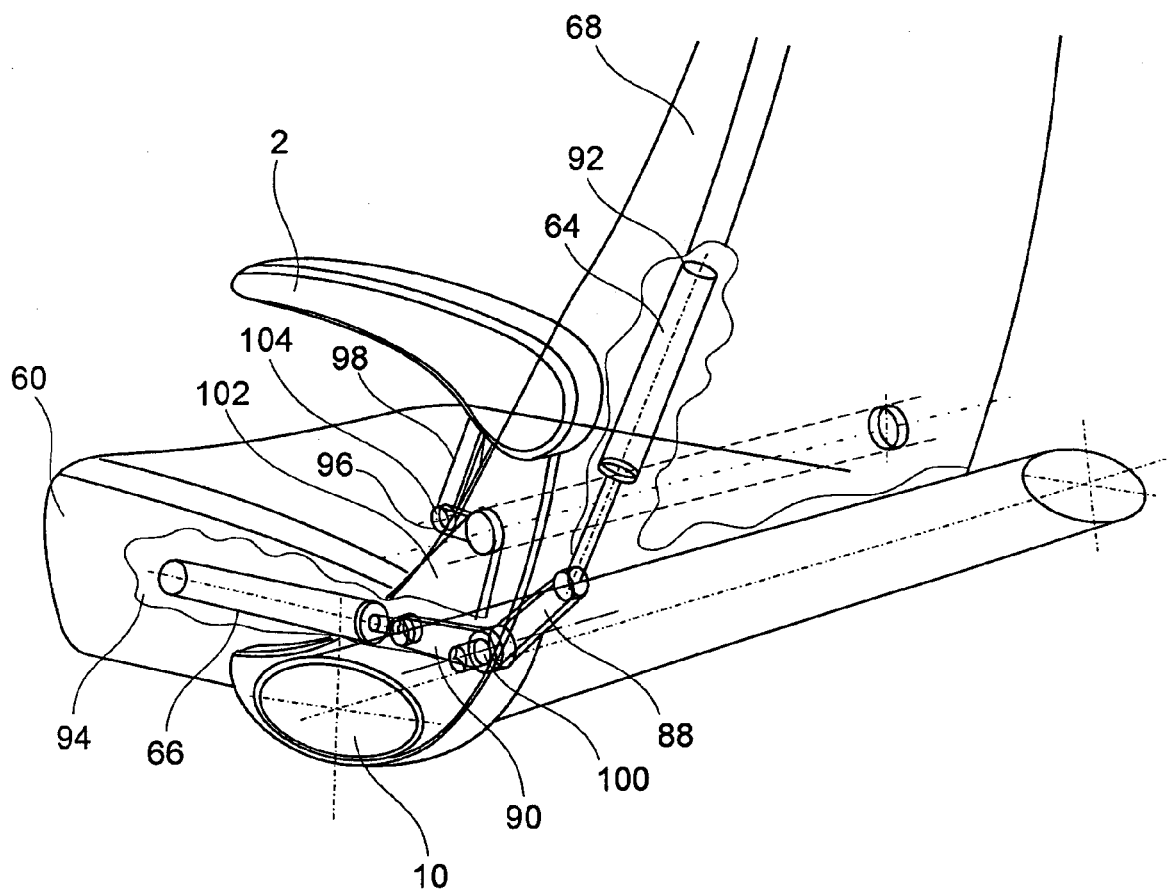
FIG. 7 shows a schematic three dimensional view of a further exemplary embodiment of a flight passenger seat in an airplane, according to the present invention.

FIG. 7 shows a schematic three dimensional view of a further exemplary embodiment of a flight passenger seat in an airplane, according to the present invention. In contrary to FIG. 4, FIG. 5 and FIG. 6, the ends 92 and 94 of the reset elements 64 and 66 are not mounted in a punctually moveable manner, but they are firmly mounted. Therefore, there has not to be provided any additional pivoting space for the reset elements. The modifications of the circumstances of articulation, which are still existing, in this case are compensated by a first intermediate lever 88 and a second intermediate lever 90. The intermediate levers are rotatably mounted on the shared bolt counter bearing 100. It is also possible to mount the intermediate levers at separate bolt counter bearings 72 and 74. Since no additional pivot space for the reset elements is needed, for this exemplary embodiment no additional space is needed in the seat element 60 and the back element 68.

The coupling of the arm rest 2 of a seat with the seat element 60 is also shown in FIG. 7. At the suspension 102 of the seat element 60, a lever 96 is mounted in a torque proof manner. If the seat element 60 is pivoted in the direction of the back element 68, the articulation 104 moves upwards on a circular path. By means of the articulation 104, the circular movement is transformed into a linear movement by the coupling rod 98, which is connected with the arm rest 2 providing the lifting of the arm rest 2. In an advantageous manner, thus, not only needless traffic area occupied by the seat element 60 is cleared, but also the area occupied by the arm rest 2.

Figure 8:
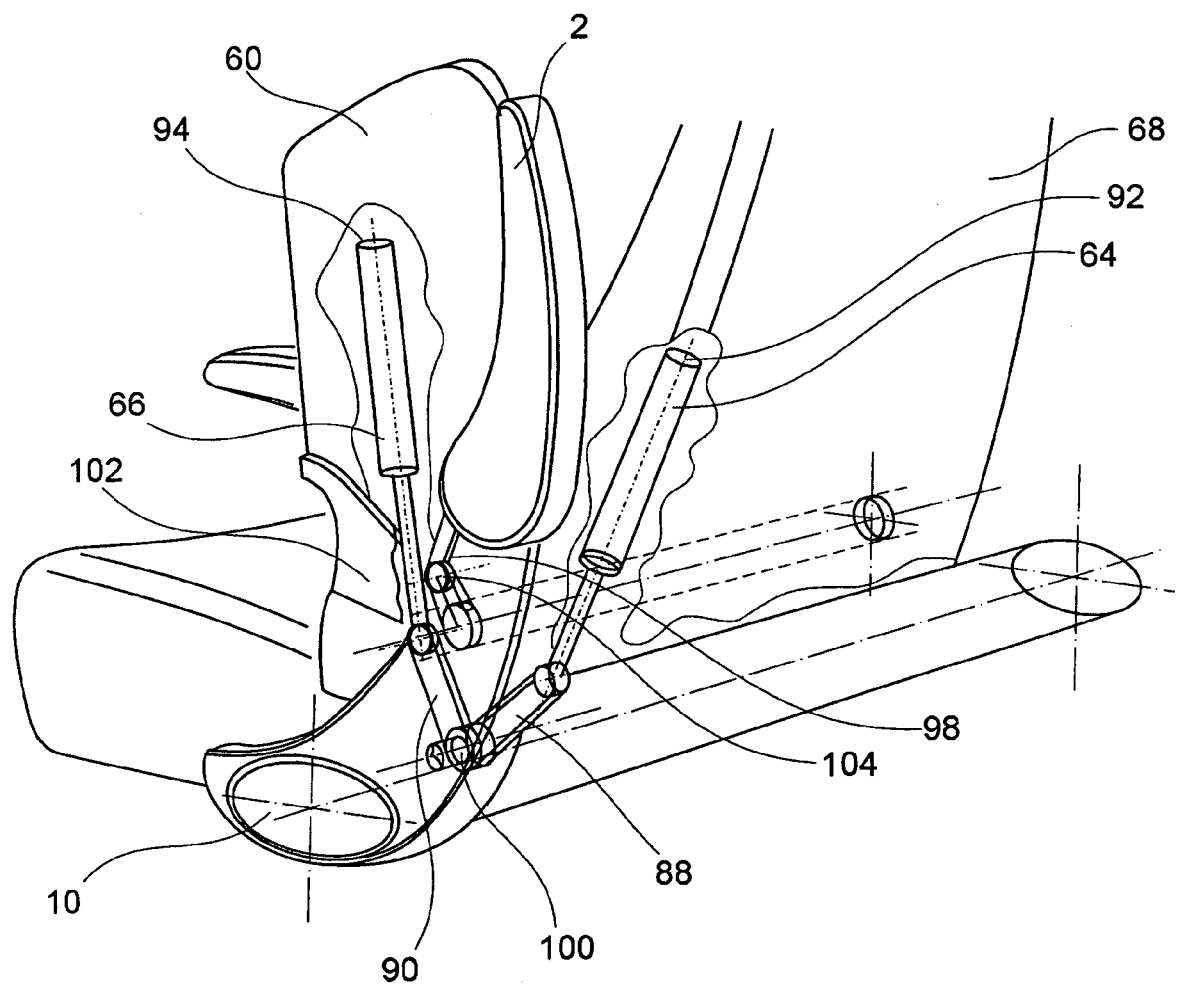
FIG. 8 shows a schematic three dimensional view of a further exemplary embodiment of a flight passenger seat, as shown in FIG. 7, having a pivoted seat element.

FIG. 8 shows a schematic three dimensional view of a further exemplary embodiment of a flight passenger seat as shown in FIG. 7 with a pivoted seat element.

Figure 9:
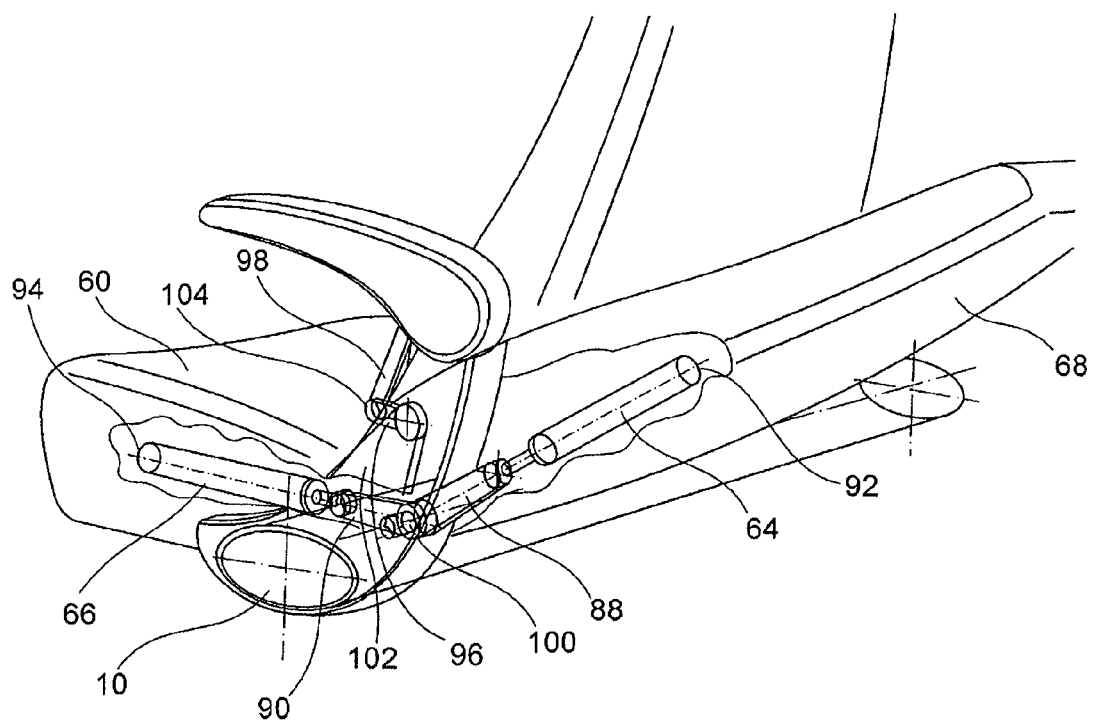
FIG. 9 shows a schematic three dimensional view of a further exemplary embodiment of a flight passenger seat, as shown in FIG. 7, having a pivoted back element.

FIG. 9 shows a schematic three dimensional view of a further exemplary embodiment of a flight passenger seat as shown in FIG. 7 with a pivoted back element.

Figure 10:
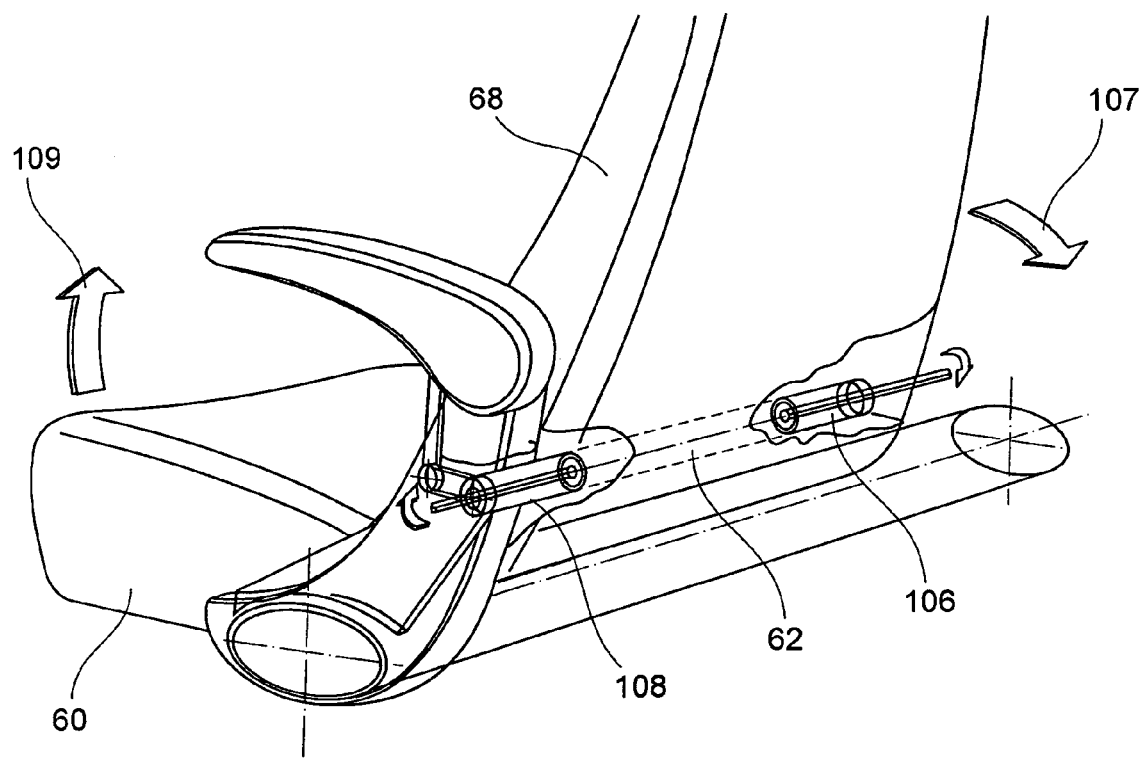
FIG. 10 shows a schematic three dimensional view of a further exemplary embodiment of a flight passenger seat in an airplane, according to the present invention.

FIG. 10 shows a schematic three dimensional view of a further exemplary embodiment of a flight passenger seat in an airplane, according to the present invention. In case of this exemplary embodiment, reset elements with linear expansion or compression were omitted. Instead, (for example frictional) torsion springs are applied. Spiral springs or hair needle springs may also be thought of. The advantage of torsion springs is that the resetting torques may be generated directly at the rotating axes. Thus, they may be integrated well into the seat element or back element, respectively. There is no additional installation space necessary for this kind of spring. The position of the rotating axes for the seat element 60 and the back element 68 may be freely chosen, so that it only has to obey ergonomic considerations. Now, in FIG. 10 are shown a first torsion rod 106 and a second torsion rod 108. Both torsion rods are provided on a shared axis 62.

FIG. 10 shows the exemplary embodiment in case the seat position is normal. Starting from this position, the back element 68 may be pivoted backwards according to the direction of arrow 107. Thereby, the torsion rod 106 generates a moment which tries to bring the back element 68 into a vertical position, against the direction of arrow 107. In this pivoted position, a second torsion rod 108 generates a torque onto the seat element 60, to have it erected again in the upright position in the direction of arrow 109.

Figure 11:
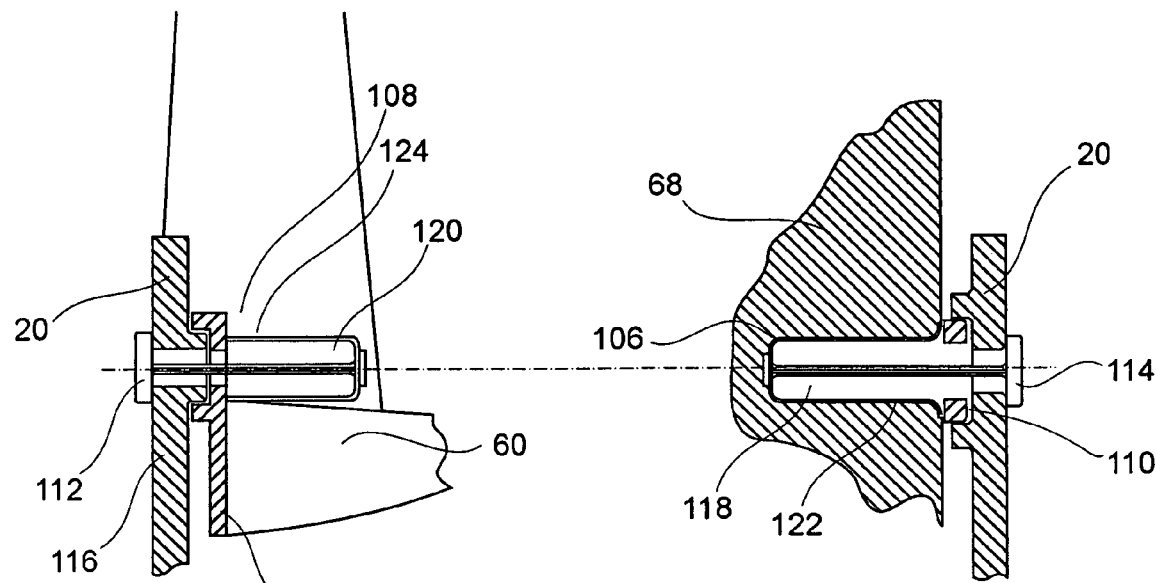
FIG. 11 shows a schematic view of an exemplary embodiment of the mounting of a seat element and of a back element by means of torsion springs for a flight passenger seat in an airplane, according to the present invention.

FIG. 11 shows a schematic view of an exemplary embodiment of the mounting of a seat element and a back element by means of a torsion spring for a flight passenger seat in an airplane, according to the present invention. It is thereby made clear, how the torsion rods 106 and 108 are connected with the back element 68 and the seat element 60. The seat divider 20 is provided with a bearing bush 110 for mounting the back element. At the seat divider 20 is mounted a bush 114 which receives a first axis 118. It is rigidly connected with the seat divider 20, and a first casing 122 is mounted around it, which is firmly connected with the back element 68. By means of this casing 122, the torque generated by the torsion rod 106 which is formed by casing 122, axis 118 and the spring element contained therein is transferred to the back element 68. Another seat divider 20 provides a bearing bolt 112, at which the suspension of the seat element 60 is supported. A second bush 116 receiving a second axis 120 is mounted at the seat divider. It is rigidly connected with the seat divider 20, and a casing 124 is mounted around it, which is firmly connected with the suspension of the seat element 60. By means of this casing 124, a torque generated by the torsion rod 108, which is formed by the casing 124, axis 120 and the spring element contained therein is transferred to the seat element 60.

Figure 12:
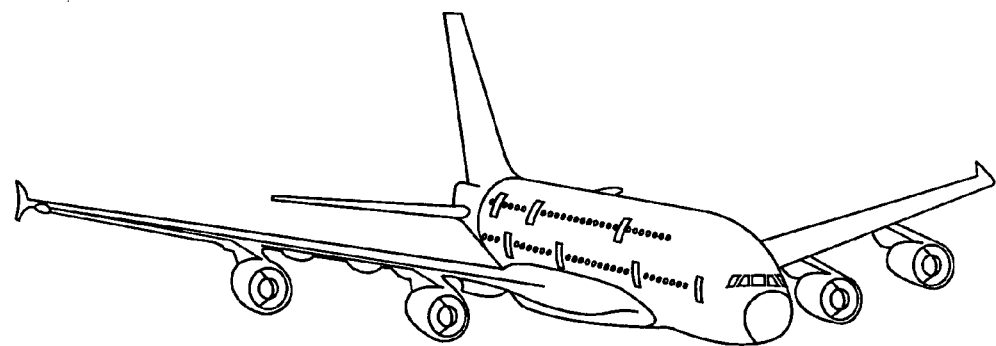
FIG. 12 shows an aircraft, particularly a commercial airplane, exhibiting at least one seat according to the present invention.

FIG. 12 shows an air vehicle, particularly a commercial airplane, showing at least one seat, according to the present invention.

It should be noted that the term "comprising" does not exclude other elements or steps and that "a" or "an" does not exclude a plurality. Also elements described in association with different embodiments may be combined.

The invention claimed is:

1. A flight passenger seat for an airplane comprising:
   a pivotable back element;
   a seat element; and
   at least one first reset element, one end of the at least one first reset element mounted inside the back element in a fixed manner relative to the back element and an end opposite to the fixedly mounted end of the at least one first reset element mounted to a first intermediate lever in a rotatable manner;
   wherein the at least one first reset element acts on the pivotable back element to cause pivoting.

2. The flight passenger seat of claim 1,
   wherein a locking mechanism is provided to lock the back element in a pivoted position.

3. The flight passenger seat of claim 1, further comprising an arm rest element;
   wherein the arm rest element is pivotable;
   wherein at least one second reset element acts on the arm rest element.

4. The flight passenger seat of claim 1,
   wherein the back element comprises at least one rocker element;
   wherein the at least one first reset element acts on the rocker element such that on pivoting the back element, a force is applied on the back element by means of the at least one first reset element which acts against a pivoting movement.

5. The flight passenger seat of claim 1,
   wherein the at least one first reset element is disposed in a generally vertical arrangement.

6. The flight passenger seat of claim 1, further comprising a submerged rod having an end, a connecting link and a linear guide and
   wherein the end of the submerged rod is guided in the connecting link with the linear guide;
   wherein the linear guide defines an elongated hole;
   wherein the elongated hole has a first end and a second end;
   wherein the first end defines a first distance to a pivoting axis of the back element;
   wherein the second end of the elongated hole defines a second distance to the pivoting axis of the back element;
   wherein the elongated hole is adapted in such a way that the first distance is larger than the second distance;

wherein, on moving in a pivoting direction, the end of the submerged rod performs a circular movement about the pivoting axis, such that by guiding the end of the submerged rod in the elongated hole, the reset element is compressed in such a manner that a force counteracting the pivoting movement is generated which, on releasing the first reset element, forces the back element into an upright position.

7. The flight passenger seat of claim 1,
wherein the at least one first reset element is mounted at a first distance to the at least one rotating axis of the back element such that on pivoting the back element, a torque is applied, which urges the back element into an upright position;
wherein at least one second reset element is arranged in the seat element;
wherein the seat element is rotatably supported by at least one other rotating axis;
wherein the at least one second reset element is mounted at a second distance to the at least one other rotating axis in such a way that a torque is applied, which, on pivoting in a horizontal position, urges the seat element into a vertical position.

8. The flight passenger seat of claim 7,
wherein the at least one first reset element and the at least one second reset element are mounted onto a shared bolt.

9. The flight passenger seat of claim 7,
wherein the at least one second reset element is mounted to a second intermediate lever in a rotatable manner; and
wherein the first and second intermediate levers are mounted to a shared axis in a rotatable manner.

10. The flight passenger seat of claim 1,
wherein the at least one first reset element is arranged as an element with a linear expansion or spring.

11. Flight passenger seat group, comprising at least two flight passenger seats according to claim 1.

12. Airplane with at least one flight passenger seat according to claim 1 or one flight passenger seat group, according to claim 11.

13. A flight passenger seat for an airplane, comprising:
a back element;
a pivotable seat element; and
at least one first reset element, one end of the at least one first reset element mounted inside the seat element in a fixed manner relative to the seat element and an end opposite to the fixedly mounted end of the at least one first reset element mounted to a first intermediate lever in a rotatable manner;
wherein the at least one first reset element acts on the pivotable seat element.

14. The flight passenger seat of claim 13, further comprising:
a pivotable arm rest element;
at least one second reset element, the at least one second reset element acting on the arm rest element.

15. The flight passenger seat of claim 13, wherein the seat element comprises at least one rocker element;
wherein the at least one first reset element acts on the rocker element such that on pivoting the seat element, a force is applied on the seat element by means of the at least one first reset element which acts against a pivoting movement.

16. The flight passenger seat of claim 13, further comprising a submerged rod having an end, a connecting link and a linear guide and
wherein the end of the submerged rod is guided in the connecting link with the linear guide;
wherein the linear guide defines an elongated hole;
wherein the elongated hole has a first end and a second end;
wherein the first end defines a first distance to a pivoting axis of the back element;
wherein the second end of the elongated hole defines a second distance to the pivoting axis of the back element;
wherein the elongated hole is adapted in such a way that the first distance is larger than the second distance;
wherein, on moving in a pivoting direction, the end of the submerged rod performs a circular movement about the pivoting axis, such that by guiding the end of the submerged rod in the elongated hole, the reset element is compressed in such a manner that a force counteracting the pivoting movement is generated which, on releasing the first reset element, forces the seat element into a horizontal position.

* * * * *